United States Patent Office 3,087,781
Patented Apr. 30, 1963

3,087,781
PREPARATION OF SPHERICAL URANIUM
DIOXIDE PARTICLES
Ralph P. Levey, Jr., Oak Ridge, and Alfred E. Smith, South Clinton, Tenn., assignors to the United States of America as represented by the United States Atomic Energy Commission
No Drawing. Filed May 19, 1961, Ser. No. 111,406
3 Claims. (Cl. 23—14.5)

Our invention relates to the preparation of nuclear reactor fuel material and more particularly to a method for preparation of spherical uranium dioxide particles.

Uranium dioxide is useful as fuel material for various types of nuclear reactors. $UO_2$ may be utilized in the form of solid compacts or as a dispersion of $UO_2$ particles in a continuous, non-fissible matrix. Dispersed $UO_2$ fuel elements offer advantages in that fission-product damage to the structural matrix is minimized and better mechanical and physical properties are obtainable in the fabricated fuel elements. Dispersion-type $UO_2$ fuel elements are prepared by disposing $UO_2$ particles between sheets of matrix material such as aluminum and working the material by means of conventional rolling to cause the matrix material to flow around the $UO_2$ particles.

One of the problems presented in the fabrication of dispersion-type $UO_2$ fuel elements is the provision of $UO_2$ particles with suitable properties, particularly particle size, particle shape and density. Fission-product damage in this type fuel element is decreased with increasing $UO_2$ particle size; relatively large particles are thus advantageous. Because of other considerations such as limitations on fuel element thickness, however, the maximum allowable $UO_2$ particle diameter for fuel elements of current interest is approximately 200 microns. Particles of a uniform size within the range of 80 to 150 microns are most suitable. Particles of irregular shape tend to break or chip during rolling, resulting in tracks or void spaces in the matrix material. Spherical particles present the strongest possible geometry to minimize this tendency. High density, i.e., a geometric density of at least 95 percent of theoretical as determined by water-displacement or mercury-displacement techniques, is also desired in the $UO_2$ particles.

Spherical $UO_2$ particles have been prepared by various methods such as precipitation of uranium compounds in spherical form and conversion of the compounds to $UO_2$, reduction of spherical $UO_3$ particles to $UO_2$ in a fluidized bed reactor, flame fusion of non-spherical $UO_2$ particles and repeated sieving of non-spherical $UO_2$ particles. These methods, however, have presented serious disadvantages in the low densities obtained or in the low yield of suitable particles and the resulting high costs incurred.

It is, therefore, an object of our invention to provide a method of preparing sperical $UO_2$ particles.

Another object is to provide a method of preparing spherical $UO_2$ particles approximately 80 to 150 microns in diameter.

Another object is to provide a method of preparing high-density spherical $UO_2$ particles.

Other objects and advantages of our invention will be apparent from the following detailed description and claims appended thereto.

In accordance with our invention spherical $UO_2$ particles are prepared by tumbling sinterable $UO_2$ powder in the presence of 1 to 5 weight percent water. The resulting spherical particles are then sintered to obtain a high density. Spherical particles with the high density and size required for dispersed-$UO_2$ fuel elements are readily obtained by this method.

We have found that sinterable $UO_2$ powder forms spherical particles with a high "green" or unsintered density upon being tumbled in the presence of water, the density of the unsintered particles (over 4 grams per cubic centimeter) being equivalent to the density obtained by pressing the $UO_2$ powder into compacts at a pressure of 8,000 pounds per square inch. Further densification of the spherical particles, i.e., up to a geometric density of 95 to 98 percent of theoretical, is obtained upon sintering. Although our invention is not to be understood as limited to a particular theory, it is postulated that the small amount of hexavalent uranium present in sinterable $UO_2$ reacts chemically with the water and the resulting chemical combination promotes the formation of dense spheres upon tumbling and sintering.

Sinterable $UO_2$ is required in order to form spherical particles and sinter to a high density. "Sinterable $UO_2$" as used herein refers to $UO_2$ powder which sinters to a solid mass with a density of at least 10.6 grams per cubic centimeter upon being compressed at a pressure of 20,000 pounds per square inch and heated to a temperature of 1800° C. for two hours under a reducing atmosphere. The sintering of $UO_2$ powder is highly complex and may vary markedly and unpredictably with slight changes in $UO_2$ preparation conditions or physical properties. Consequently, empirical testing of the starting $UO_2$ powder by compressing and heating a sample of the powder under the conditions described above is preferred to determine the suitability of the $UO_2$ for sphere formation. The physical properties of sinterable $UO_2$ normally fall within the following limits: surface area, .5 to 6 square meters per gram; average particulate size, .5 to 20 microns; and tap density, 2 to 5 grams per cubic centimeter. The oxygen-to-uranium ratio of sinterable $UO_2$ falls within the range of 2.08 to 2.15.

The method of preparing the starting $UO_2$ is not critical to our invention, and any of the previously known methods for preparing $UO_2$ with the desired properties may be employed. Suitable $UO_2$ powder may be prepared by the method disclosed in copending application S.N. 60,280, entitled "Preparation of $UO_2$ for Nuclear Reactor Fuel Pellets," filed September 30, 1960, by John M. Googin, now U.S. Patent No. 3,037,839, issued June 5, 1962, and assigned to a common assignee. In this method uranium is precipitated as polyuranates from fluoride solution with excess ammonium ions; the precipitate is recovered by filtration and converted to $U_3O_8$ with steam; the $U_3O_8$ is reduced to $UO_2$ with hydrogen and the $UO_2$ is stabilized by partial reoxidation to an oxygen-to-uranium ratio of 2.08 to 2.13. This material readily forms high density spheres upon tumbling in the presence of water, but because of its high sinterability requires careful handling in firing. $UO_2$ prepared by other methods may require a pre-treatment comprising comminution by means of grinding or ball-milling. Comminution by means of ball-milling with uranium balls is preferred. For example, $UO_2$ may be prepared by precipitating uranium as peruranates from uranyl nitrate solution with excess hydrogen peroxide, filtering and calcining the precipitate at a temperature of 600° C. and reducing the calcined precipitate at a temperature of 600° C. Depending upon the conditions employed in precipitation, this material may not be sufficiently sinterable for sphere formation. Adequate sinterability may be obtained by ball-milling the $UO_2$ with uranium balls to an average size of 5 microns. Sintered $UO_2$ may also be converted to a sinterable form suitable for sphere preparation by crushing and sieving the sintered $UO_2$ and ball-milling the resulting particles.

The sinterable $UO_2$ is provided with approximately 1 to 5 weight percent water. At least about 1 percent water is required for formation of high-density spheres, and at a moisture content over 5 percent the mixture becomes too wet to spheroidize. The size of the resulting spheres varies with the amount of moisture, an increase in moisture resulting in decreased spheroid diameter. At 1 percent water the spheroid diameter is 250 to 400 microns, and the spheroids of primary interest for dispersion-type UO fuel elements, i.e., 80 to 150 microns, are obtained at a moisture level of about 3 to 5 percent.

The water-containing $UO_2$ is then tumbled to form spheres. Tumbling is effected by placing the $UO_2$ in a suitable container such as a horizontally disposed cylinder, sealing and rotating the container whereby the $UO_2$ particles are lifted sufficiently by the side of the container to fall down by gravity over one another. The speed of rotation of the container is adjusted to provide tumbling of the particles rather than free sliding, which occurs at excessive speeds. Rotation at a speed within the range of 50 to 150 revolutions per minute provides the desired particle action for glass-walled cylinders one to three inches in diameter and one-half filled with powder. The optimum tumbling speed may be varied slightly for containers of other sizes or other materials of construction such as metal or rubber-lined cylinders. Although the material employed is not critical, a glass cylinder is preferred.

The moisture-containing $UO_2$ is tumbled until relatively uniform-sized particles are obtained. The tumbling time varies with the moisture content, longer times being required with increasing moisture. Equilibrium of spheroid size is normally attained within a period of 24 to 72 hours. For the preparation of particles 80 to 150 microns in diameter at least 48 to 72 hours is preferred.

Where over 2 percent moisture is employed, it is preferred to add the water in steps because of the tendency of the mixture to form an initial sticky mass. The mixture is tumbled for a period of 2 to 4 hours and the remaining moisture is added. The effect of moisture content on spheroid size is demonstrated in this procedure. The powder is initially formed into relatively large spheroids, and upon addition of more water the spheroids are degraded to smaller sizes until relatively uniform size is obtained for a given total water content.

The spherical particles prepared by tumbling are removed from the container and sintered to obtain final densification. Sintering is effected by heating the particles to a temperature of at least 1750° C., and preferably 2000° C. Sintering is carried out under an atmosphere of a reducing gas such as hydrogen in order to prevent oxidation. In the course of sintering, particularly in the case of smaller particles, the individual particles tend to agglomerate and form a coherent mass. This tendency may be minimized by stepwise heating of the particles to the sintering temperature. For example, the particles may be initially heated to 1200° C., held at this temperature for two hours, removed, sieved and reheated to and maintained at higher temperatures for two hours each in increments 200° C. to 250° C. higher until 2000° C. reached. Agglomeration may also be prevented by spreading the particles thinly during sintering.

The sintered particles are then removed from the furnace, and off-size particles are separated by conventional classification techniques such as sieving. The geometric density of particles prepared in this manner is 10.4 to 10.8 grams per cubic centimeter, or 95 to about 98 percent of theoretical.

Our invention is further illustrated by the following specific example.

*Example*

Highly sinterable $UO_2$ powder was formed into spherical particles by providing 2.7 weight percent water in the $UO_2$ and tumbling the wetted powder. The starting $UO_2$ was prepared by precipitating ammonium polyuranates from uranyl fluoride solution with excess ammonium ions, converting the precipitate to $U_3O_8$ with steam, reducing the $U_3O_8$ to $UO_2$ with hydrogen and stabilizing the $UO_2$ by slight reoxidation. Properties of the starting $UO_2$ were as follows: surface area, 6 square meters per gram; average particulate size, 17 microns; and tap density 2.17 grams per cubic centimeter. 595 grams of the $UO_2$ was placed in a glass cylinder 3 inches in diameter and 4 inches long. About 8 grams of water was added to the powder and the cylinder was sealed. The cylinder was rotated at 150 revolutions per minute for two hours and additional water was added to the $UO_2$ to produce a water content of 2.7 weight percent. The cylinder was then rotated for 80 hours at 150 r.p.m. The $UO_2$ was then removed and sieved to separate the various size fractions of the resulting particles, and the tap density was determined. The results obtained were as follows:

| Size Fraction (U.S. Standard Mesh) | Grams of $UO_2$ | Tap Density (grams per cubic centimeter) |
|---|---|---|
| −100, +170 | 225 | 4.65 |
| −170, +325 | 260 | 4.62 |
| −325 | 110 | |

The particles were determined by visual examination to be smooth-surfaced spheres. Particles with the tap density thus obtained in the unsintered state sinter readily to a density of at least 10.4 grams per cubic centimeter (95% of theoretical) upon firing. The particles of the −100, +170 size fraction are particularly suitable for use in dispersion type nuclear reactor fuel elements.

The above example is merely illustrative and is not to be understood as limiting the scope of our invention, which is limited only as indicated in the appended claims.

Having thus described our invention, we claim:

1. The method of preparing high-density, spherical $UO_2$ particles 80 to 150 microns in diameter which comprises providing 3 to 5 weight percent water in sinterable $UO_2$ powder, tumbling said water-containing powder for a period of at least 48 hours whereby spherical particles are formed and sintering the resulting spherical particles.

2. The method of preparing high-density, spherical $UO_2$ particles 80 to 150 microns in diameter which comprises providing about 2 weight percent water in sinterable $UO_2$ powder, tumbling the resulting water-containing powder for a period of at least about 2 hours, adding 1 to 3 weight percent water to the resulting tumbled agglomerates, tumbling the resulting wetted agglomerates for a period of at least about 48 hours and sintering the resulting spherical particles.

3. The method of preparing high-density, spherical $UO_2$ particles 80 to 150 microns in diameter which comprises providing about 2 weight percent water in sinterable $UO_2$ powder, tumbling the resulting water-containing powder for a period of at least about 2 hours, adding 1 to 3 weight percent water to the resulting tumbled agglomerates, tumbling the resulting wetted agglomerates for a period of at least about 48 hours, initially heating the resulting spherical particles to a temperature of approximately 1200° C. in a reducing atmosphere and subsequently heating said particles to a temperature of at least approximately 2000° C. in a reducing atmosphere in increments of 200° C. to 250° C. for a period of at least approximately 2 hours at each of said increments, sieving said particles between each of said increments and recovering the resulting sintered particles.

References Cited in the file of this patent

BMI-1009, pages 11, 18–21, June 16, 1955, declassified February 28, 1957. (Copy in Div. 46.)

Martin et al.: "Chem. and Process Engrg.," July 1960, pp. 293, 294. (Copy in POSL.)

Chalder et al.: "2nd Geneva Conference on Peaceful Uses of Atomic Energy," vol. 6, page 593, September 1958. (Copy in POSL.)

TID 7546, Book 2, pages 436, 455, November 1957. (Copy in POSL.)